May 4, 1965
V. J. JANDASEK
3,181,393
TRANSMISSION
Filed Oct. 23, 1962
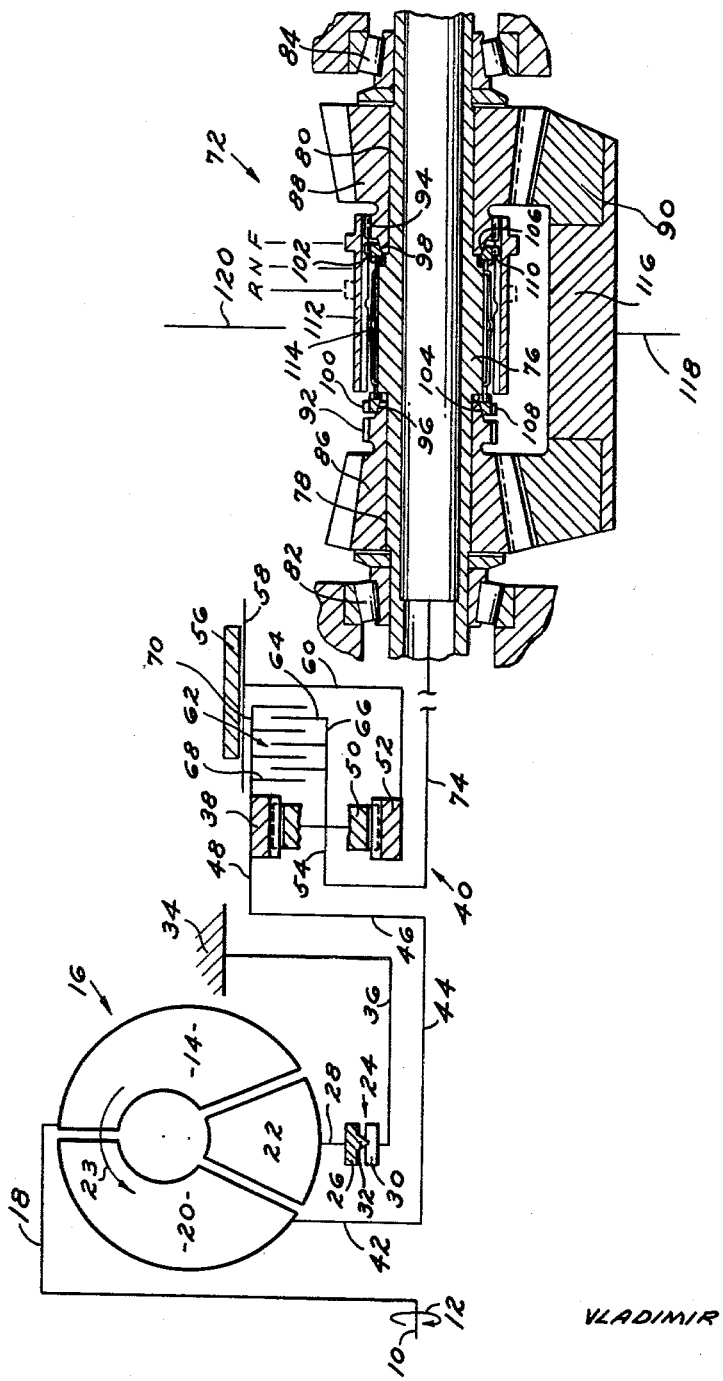
VLADIMIR J. JANDASEK
INVENTOR.
BY
John R. Faulkner
Robert E. McCollum
ATTORNEYS

3,181,393
TRANSMISSION
Vladimir J. Jandasek, Dearborn, Mich., assignor to Ford Motor Company, Dearborn, Mich., a corporation of Delaware
Filed Oct. 23, 1962, Ser. No. 232,419
8 Claims. (Cl. 74—732)

This invention relates to an automatic transmission, and to one preferably for use in a motor vehicle.

More specifically, the invention relates to a small automatic transmission construction that is simple in design and economical to manufacture.

Therefore, it is an object of the invention to provide a small, low-cost automatic transmission having a minimum number of elements and controls for establishing a plurality of forward drive speed ranges and reverse.

It is a further object of the invention to provide an automatic transmission having a power input shaft coupled to an output shaft through a hydrodynamic drive device, a single gear set, and a direction reversing assembly.

It is a still further object of the invention to provide an automatic transmission having an output shaft extending substantially at right angles to the direction of extension of the power input shaft.

It is also an object of the invention to provide an automatic transmission providing a plurality of drives by the use of a hydraulic torque converter combined with a planetary gear set and a double axle pinion assembly controlling the direction of rotation of the transmission output shaft.

Other objects, features and advantages will become apparent upon reference to the succeeding, detailed description of the invention and to the drawing illustrating the preferred embodiment thereof.

The drawing shows schematically a transmission of the transaxle type. It has an input shaft 10 rotating in a forward or clockwise direction as indicated by the arrow 12 and driven by a power source (not shown), such as, for example, the internal combustion engine for a motor vehicle. The input shaft is drivingly fixed to the rotatable impeller or pump 14 of a hydraulic torque converter 16 by means of a shell 18 partially surrounding the converter. The converter is of a known type having a forwardly rotating turbine 20 and a rotatable reaction member or stator 22.

The pump, turbine and stator together define a closed toroidal path for the circulation of fluid in the direction of the arrow 23 from the pump through the turbine and stator to provide torque multiplication in a known manner. The stator 22 is prevented from rotating in a reverse or counterclockwise direction at low forward rotational speeds of the pump 14 by means of a one-way overrunning brake 24. The brake has an outer race 26 fixed to the stator by a connector 28 and is separated from its inner race 30 by sprags or rollers 32. The inner race is fixed to the transmission housing 34 by a connector 36, and is therefore held stationary at all times. The stator acts as a reaction member at low forward pump speeds in a known manner, and is released to rotate forwardly at higher pump speeds when the fluid exit angle from the turbine is more favorable.

Turbine 20 drives the input annulus or ring gear 38 of a gear set 40 through a connecting flange 42, an intermediate shaft 44, and connectors 46 and 48. The gear set is of the simple planetary type having a number of spaced pinions 50 (only one shown) meshing with the ring gear and a sun gear 52. The pinions are rotatably supported upon a carrier 54 constituting the output member of the gear set.

The gear set is conditioned for a reduction drive by holding sun gear 52 stationary by means of a brake member 56. Member 56 may be of the fluid pressure actuated band type or any other suitably actuated type, and is adapted to engage a drum member 58 fixed to sun gear 52 by a connector 60. Forward rotation of ring gear 38 therefore causes pinions 50 to walk around or planetate about the stationary sun gear effecting a forward rotation of carrier 54 at a reduced speed.

The gear set is conditioned for a direct drive from the input ring gear to the carrier by means of a fluid pressure actuated clutch 62 between the two. The clutch has internal annular friction discs 64 secured to an extension 66 of carrier 54 interleaved with a set of friction discs 68 secured to an axial extension 70 of ring gear 38. Actuation of clutch 62 upon release of brake 56 therefore locks up the gear set and rotates carrier 54 at the speed of ring gear 38.

The transmission as thus far described provides two forward drive speed ratios. Reverse drive is obtained by means of a dual drive synchronized axle pinion assembly 72. As shown, the carrier 54 is fixed to one end of a power output pinion drive shaft 74, the opposite end of which is surrounded by a synchronizer hub 76 splined or otherwise secured to it. The hub has axially extending sleeve portions 78 and 80 rotatably supported within the transmission housing by means of tapered roller bearings 82 and 84. A pair of drive pinion gears 86 and 88 are rotatably mounted on the sleeve portions, and each mesh with a diametrically opposite portion of a differential ring gear 90 to drive the gear in opposite directions.

The pinion gears are selectively coupled to the shaft 74 by the synchronizer. For this purpose, gears 86 and 88 are formed with clutch teeth 92 and 94 and external conical clutch surfaces 96 and 98. Blocker rings 100 and 102 are rotatably disposed about the clutch surfaces 96 and 98, and have internal mating conical clutch surfaces 104 and 106. The rings also are formed with external teeth 108 and 110. A synchronizer clutch sleeve 112 is slidably splined upon hub 76 and can be moved axially to engage either the clutch teeth 92 or 94. A synchronizer thrust bar 114 is actuated by the sleeve 112 and is adapted to apply a clutching force to either of the blocker rings 100 or 102. A clutching action between the blocking ring and the associated cone clutch surfaces establishes synchronization between shaft 74 and gear 86 or 88 at a time prior to engagement of the gear clutch teeth by the internal spline teeth on the synchronizer sleeve.

Therefore, when the sleeve 112 is moved to the left, for example, as seen in the figure, the thrust bar 114 engages blocker ring 100 to engage conical surfaces 96 and 104 establishing synchronism between shaft 74 and gear 86. Clutch teeth 108 on the blocker element and teeth 92 on the gear 86 are then engaged with the teeth on sleeve 112, and gear 86 is locked to shaft 74. A similar action occurs when the sleeve 112 is moved to the right to lock gear 88 to shaft 74.

Locking gear 88 to shaft 74 therefore drives ring gear 90 in a forward or clockwise direction, while locking gear 86 to the shaft drives the ring gear in a reverse or counterclockwise direction. Clutch sleeve 112 is shown in its forward drive position indicated by the line F, locking gear 88 to shaft 74. The positions of the sleeve for a Neutral, or no-drive condition, or a Reverse drive of the ring gear are indicated by the lines N and R.

The ring gear 90 is secured to the carrier 116 (shown only schematically) of a differential assembly having side gears (not shown) secured to shafts 118 and 120 for rotation in a known manner. The shafts each form a portion of a universal joint yoke connected to the drive shafts for each of the vehicle wheels. Thus, it will be seen that the transmission is of the transaxle type; that is, the power output drive is to shafts that are at right angles with respect to the direction of extension of the power input shaft 10.

The operation is believed to be clear from the above description and from a consideration of the drawing. However, to summarize briefly, Neutral is established by moving clutch sleeve 112 to the N position and disengaging brake 56 and clutch 62. No drive is therefore transmitted from input shaft 10 to shaft 74 or shafts 118 and 120.

Low speed forward drive is established by moving clutch sleeve 112 to the F position, and engaging brake 56. Forward rotation of input shaft 10 and pump 14 rotates turbine 20 forwardly, stator 22 being held against reverse rotation by engagement of one-way brake 24. Ring gear 38 is therefore driven forwardly by turbine 20 causing pinions 50 to planetate clockwise about the stationary sun gear 52. Carrier 54, shaft 74, pinion 88, ring gear 90 and the output shafts 118 and 120 are therefore driven in a clockwise direction at speeds reduced from that of the speed of input shaft 10 and dependent upon the reduction through both the gear set and differential.

A direct forward drive from input shaft 10 to shaft 74 is provided by engaging clutch 62 and disengaging brake 56. The gear set is therefore locked up by the drive of ring gear 38 and carrier 54 at the same speeds by turbine 20. The stator 22 at this time freewheels in a forward direction.

Reverse drive is established by moving clutch sleeve 112 to the R position, engaging brake 56 and disengaging clutch 62. Accordingly, the gear set is conditioned for a forward reduction drive causing carrier 54, shaft 74 and pinion 86 to rotate forwardly at a speed reduced from that of shaft 10 to rotate ring gear 90 and shafts 118 and 120 in a reverse or counterclockwise direction. A direct drive through the gear set may also be established for reverse, if so desired.

The synchronized connection of pinions 86 and 88 to the shaft 74 permits a smooth shift to be made from a forward to a reverse drive or vice versa with the engine running without clashing of the pinion gear and clutch teeth.

From the foregoing, therefore, it will be seen that the invention provides a transmission affording two forward drive speed ranges, neutral and one or more reverse drive ranges simply by the use of a single hydrodynamic drive device and a single, simple gear set combined with a direction reversing axle assembly. Thus, the transmission is economical to manufacture, and requires only a minimum number of fluid pressure actuated devices, thereby simplifying the controls for the transmission.

While the invention has been illustrated in its preferred embodiment in connection with a transaxle type of transmission, it will be clear to those skilled in the arts to which the invention pertains that many changes and modifications may be made thereto without departing from the scope of the invention.

I claim:

1. A transmission comprising a forwardly rotating power input shaft and an ouput shaft, and means operably connecting said shafts providing a plurality of forward drives and a reverse drive from said input shaft to said output shaft, said means comprising a hydrodynamic drive device having a rotatable pump operably connected to said input shaft and a rotatable turbine, gear means having a rotatable drive member operably connected to said turbine and other rotatable members including a driven member, selectively operable means acting on said gear means conditioning said gear means selectively for a plurality of forward drives therethrough, and selectively controlled direction reversing means operably connecting said driven member and said output shaft selectively operable for conditioning said output shaft for rotation in opposite directions by said driven member, said controlled means comprising a dual axle pinion assembly having diametrically opposed drive pinions alternately engageable with said driven member.

2. A transmission comprising a forwardly rotating power input shaft and an output shaft, and means operably connecting said shafts providing a plurality of forward drives and a reverse drive from said input shaft to said output shaft, said means comprising a hydrodynamic drive device having a rotatable pump operably connected to said input shaft and a rotatable turbine, gear means having a rotatable drive member operably connected to said turbine and other rotatable members including a driven member, selectively operable means acting on said gear means conditioning said gear means selectively for a plurality of forward drives therethrough, and selectively controlled direction reversing means operably connecting said driven member and said output shaft selectively operable for conditioning said output shaft for rotation in opposite directions by said driven member, said controlled means comprising a differential assembly having a differential ring gear fixed on said output shaft and a pair of drive pinions meshing with diametrically opposed portions of said gear and alternately engaged with said driven member.

3. A transmission comprising a forwardly rotating power input shaft and an output shaft, and means operably connecting said shafts providing a plurality of forward drives and a reverse drive from said input shaft to said output shaft, said means comprising a hydrodynamic drive device having a rotatable pump operably connected to said input shaft and a rotatable turbine, gear means having a rotatable drive member operably connected to said turbine and other rotatable members including a driven member, selectively operable means acting on said gear means conditioning said gear means selectively for a plurality of forward drives therethrough, and selectively controlled direction reversing means operably connecting said driven member and said output shaft selectively operable for conditioning said output shaft for rotation in opposite directions by said driven member, said controlled means including a gear fixed to said output shaft, spaced pinions meshing with opposite portions of said gear, and clutch means slidably mounted on said driven member for rotation therewith and movable alternately into driving engagement with each of said pinions for rotating said output shaft in opposite directions.

4. A transmission comprising a forwardly rotating power input shaft and an output shaft, and means operably connecting said shafts providing a plurality of forward drives and a reverse drive from said input shaft to said output shaft, said means comprising a hydrodynamic drive device having a rotatable pump operably connected to said input shaft and a rotatable turbine, gear means having a rotatable drive member operably connected to said turbine and other rotatable members including a driven member, selectively operable means acting on said gear means conditioning said gear means selectively for a plurality of forward drives therethrough, and selectively controlled direction reversing means operably connecting said driven member and said output shaft selectively operable for conditioning said output shaft for rotation in opposite directions by said driven member, said controlled means including a gear fixed to said output shaft, spaced pinions meshing with opposite portions of said gear, and clutch synchronizing means slidably mounted on said driven member for rotation therewith and movable alternately into driving engagement with each of said pinions for rotating said output shaft in opposite directions.

5. A transmission comprising an input shaft, an output shaft, and means operably connecting said shafts for providing a plurality of forward drives and a reverse drive therebetween, said means including a hydrodynamic drive device and a planetary gear set and a multi-axle pinion assembly, said gear set having a plurality of rotatable members including drive and driven members, said device including a pump operably connected to said input shaft and a turbine operably connected to said drive member, releasable brake means for holding one of said rotatable members stationary at times to condition said gear set for a reduction drive therethrough, selectively operable means connecting two of said plurality of rotatable members together to lock up said gear set and condition it for a direct drive therethrough upon release of said brake means, said axle assembly operably connecting said driven member to said output shaft to drive said output shaft selectively in the same direction or in a direction of rotation opposite to that of the driven member, a ring gear secured to said output shaft, said assembly including a plurality of spaced drive pinions rotatably mounted on said driven member and meshing with opposite portions of said ring gear for driving said gear in opposite directions, and means mounted between said pinions on said driven member for rotation therewith and slidable in opposite axial directions to engage one or the other of said pinions to thereby condition said transmission for a forward or reverse drive of said output shaft.

6. A transmission comprising a forwardly rotating input shaft, an output shaft, and means operably connecting said shafts, said means including a hydraulic torque converter and a planetary gear set, said torque converter having a pump, a turbine and a stator together defining a toroidal fluid flow circuit, means connecting said pump to said input shaft, said gear set having sun, pinion and ring gears and a planet carrier, means connecting said turbine and said ring gear, releasable brake means for holding said sun gear stationary at times to condition said gear set for a reduction drive therethrough, selectively operable clutch means at times connecting said carrier and said ring gear to lock up said gear set and condition it for a direct drive therethrough upon release of said brake means, and means operably connecting said carrier to said output shaft alternately for a forward or reverse drive of said output shaft by said gearing, said latter means including an intermediate shaft connected to said carrier, a ring gear secured to said output shaft, a plurality of spaced pinions rotatably mounted on said intermediate shaft meshing with opposite portions of said ring gear for driving said ring gear in opposite directions, and means mounted on said intermediate shaft for rotation therewith and slidable in opposite axial directions to engage alternate ones of said spaced pinions to thereby condition said transmission for a forward or reverse drive of said output shaft.

7. A transmission comprising a forwardly rotating input shaft, an output shaft, and means operably connecting said shafts, said means including a hydraulic torque converter and a planetary gear set, said torque converter having a pump, a turbine and a stator together defining a toroidal fluid flow circuit, means connecting said pump to said input shaft, said gear set having sun, pinion and ring gears and a planet carrier, means connecting said turbine and said ring gear, releasable brake means for holding said sun gear stationary at times to condition said gear set for a reduction drive therethrough, selectively operable clutch means at times connecting said carrier and said ring gear to lock up said gear set and condition it for a direct drive therethrough upon release of said brake means, and means operably connecting said carrier to said output shaft alternately for a forward or reverse drive of said output shaft by said gearing, said latter means including an intermediate shaft connected to said carrier, a ring gear fixed on said output shaft, a pair of spaced pinions rotatably mounted on said intermediate shaft meshing with diametrically opposite portions of said ring gear for driving said ring gear in opposite directions, and clutch synchronizing means fixed on said intermediate shaft between said pinions and slidable in opposite axial directions to smoothly engage one of the other of said spaced pinions to thereby condition said transmission for a forward or reverse drive of said output shaft.

8. A transmission comprising a forwardly rotating input shaft, an output shaft extending substantially at right angles to said input shaft, and means operably connecting said shafts, said means including a hydraulic torque converter and a planetary gear set, said torque converter having a pump, a turbine and a stator together defining a toroidal fluid flow circuit, means connecting said pump to said input shaft, said gear set having sun, pinion and ring gears and a planet carrier, means connecting said turbine and said ring gear, releasable brake means for holding said sun gear stationary at times to condition said gear set for a reduction drive therethrough, selectively operable clutch means at times connecting said carrier and said ring gear to lock up said gear set and condition it for a direct drive therethrough upon release of said brake means, and means operably connecting said carrier to said output shaft alternately for a forward or reverse drive of said output shaft by said gearing, said latter means including an intermediate shaft connected to said carrier, a ring gear fixed on said output shaft, a pair of spaced pinions rotatably mounted on said intermediate shaft meshing with diametrically opposite portions of said ring gear for driving said ring gear in opposite directions, and clutch synchronizing means fixed on said intermediate shaft between said pinions and slidable in opposite axial directions to smoothly engage one of the other of said spaced pinions to thereby condition said transmission for a forward or reverse drive of said output shaft.

References Cited by the Examiner
UNITED STATES PATENTS

| 2,510,469 | 6/50 | Greenlee | 74—781 |
| 2,669,092 | 2/54 | Hammaren | 74—378 X |
| 2,510,469 | 6/50 | Greenlee | 74—781 |

DON A. WAITE, *Primary Examiner.*